US005541257A

United States Patent [19]

Gunagan et al.

[11] Patent Number: 5,541,257

[45] Date of Patent: Jul. 30, 1996

[54] REACTIVE RINSE AID FOR PROCESSING PLASTIC SURFACES

[75] Inventors: Barry P. Gunagan, Hatboro; Jeffrey I. Melzer, Lansdale, both of Pa.

[73] Assignee: Betz Laboratories, Inc., Trevose, Pa.

[21] Appl. No.: 407,174

[22] Filed: Mar. 21, 1995

Related U.S. Application Data

[63] Continuation-in-part of Ser. No. 282,121, Jul. 28, 1994, abandoned.

[51] Int. Cl.[6] ........................................ C08F 8/00

[52] U.S. Cl. ........................ 525/132; 525/149; 525/333.7; 525/384

[58] Field of Search ................................ 525/333.7, 149, 525/384, 132, 333.7

[56] References Cited

U.S. PATENT DOCUMENTS

| | | | |
|---|---|---|---|
| 4,338,420 | 7/1982 | Arbit | 525/333.7 |
| 5,039,770 | 8/1991 | Lindert et al. | 526/312 |
| 5,266,410 | 11/1993 | Lindert et al. | 428/461 |
| 5,298,289 | 3/1994 | Lindert et al. | 427/388.4 |
| 5,314,546 | 5/1994 | Melzer et al. | 134/42 |

*Primary Examiner*—Thomas R. Weber
*Attorney, Agent, or Firm*—Alexander D. Ricci; Steven D. Boyd

[57] ABSTRACT

A method of enhancing the drainage of residual aqueous rinse from the external surfaces of plastic parts is disclosed. The method employs an aqueous solution of a tannin compound, which when applied to the surface of plastic parts will not rinse off during subsequent rinse stages and will remain on the plastic parts.

12 Claims, No Drawings

REACTIVE RINSE AID FOR PROCESSING PLASTIC SURFACES

This application is a continuation-in-part of application Ser. No. 08/282,121, filed Jul. 28, 1994 abandoned.

FIELD OF THE INVENTION

The present invention relates to processes for rinsing plastic parts. More particularly, the present invention relates to a rinse aid which enhances rinsing of plastic parts and enhances the drainage of residual rinse water from the surfaces of the plastic parts.

BACKGROUND OF THE INVENTION

In the automotive industry, formed plastic parts are often painted. This is to provide a smooth, oftentimes metal-like finish. The paint covers molding and other substrate imperfections. Decorative effects such as mirror finishes, texturing and color matching of differently processed parts are also achieved by painting.

Examples of plastics that are paintable and used in the automotive industry include polycarbonate/polyethyleneterephthalate, polycarbonate/acrylonitrile-butadiene-styrene, polycarbonate/polybutyleneterephthalate, polyphenylene oxide/nylon 66, polyphenylene oxide polybutyleneterephthalate, poly-carbonate (both untilled and glass-filled), polyphenylene oxide (both filled and untilled), resin/glass material, and thermoplastic olefins. The use of plastics in the automotive area and other areas is growing due to its durability, lightweight, and low cost. Plastics need to be cleaned before painting them. The most common contaminants that must be removed before painting include mold release agents, shop soil, material handling soil, machining soil, fingerprints and plastic sanding dust. These contaminants are removed by chemical means such as detergents.

The process of cleaning plastic parts generally entails a wash stage, a rinse stage and a final rinse stage with deionized water. The plastic parts can be either spray washed or immersed in the detergent. The most common processes are either an acidic detergent wash stage followed by multiple rinse stages, or an alkaline detergent stage followed by a rinse stage, an acidic detergent wash stage, and multiple rinse stages. For example, one process employs in stage one an alkaline wash, followed by a tap water rinse in stage two. Stage three is an acidic wash with a tap water rinse at stage four. Stages five and six are deionized water rinses.

When the plastic part is to be painted, the cleaning operation is performed in a production line with freshly cleaned parts subsequently conveyed into the paint booth. Problems can occur however, when the freshly cleaned part is not fully dry. This can lead to "spotting" when painted and will result in an imperfect paint job. This will require stripping of the part and/or additional painting procedures.

Further, when a bead of water dries on the plastic surface, ionic salts such as Cl, Ca, Mg, and K can remain on the surface. After the plastic has been painted, there will be a visual defect caused by such deposits. Exposure to humidity which can cause increased water sensitivity can lead to blistering of the paint. Adhesion problems could also result.

Removing the aqueous rinse water from the surface of the plastic requires a drainage enhancing solution which can effectively aid in drying the plastic part to be painted. The present inventors have discovered an aqueous solution which will aid in reducing spotting caused by poor drainage on the external surfaces of plastic parts. More surprisingly, the present inventors have discovered a drainage enhancing solution that is not rinsed off the surfaces of plastic parts by subsequent rinse stages. The use of rinse aids in the cleaning of plastic parts is known. For example, U.S. Pat. No. 5,314,546 discloses a process for enhancing the drainage of residual aqueous rinse from the external surfaces of plastic parts comprising a zircoaluminate compound.

SUMMARY OF THE INVENTION

The present invention provides methods for enhancing the drainage of residual aqueous rinse from the external surfaces of plastic parts comprising a tannin compound. The methods of the present invention provide enhanced drainage and the treatment remains on the surfaces of the plastic part thereby enhancing subsequent rinse stages. The rinse aid of the present invention is a "reactive" rinse aid which reacts with the plastic surface and remains effective even after rinsing with untreated water. The reactive rinse aid of the present invention thus, does not need to be added to the water of each rinse stage.

The present invention provides a rinse aid for plastic surfaces which effectively reduces the amount of residual water on the external surfaces of the plastic part prior to painting. Any water on the external surfaces can lead to spots and imperfections in the final paint finish. Furthermore, the reactive rinse aid of the present invention is not required in each rinse stage, application in one rinse stage provides effectiveness in subsequent untreated rinse stages.

DESCRIPTION OF THE PREFERRED EMBODIMENTS

The present invention provides methods for enhancing the drainage of residual aqueous rinse from the external surfaces of plastic parts. The process comprises contacting a plastic part with an effective amount for the purpose of an aqueous solution of a tannin compound, wherein the aqueous solution remains effective during subsequent rinse stages.

The tannin compounds of the present invention include but are not limited to tannic acid, tannin mimosa, tannin quebracho and tannin chestnut. The tannic acid employed in the examples is available commercially as HPC-8 from Betz Laboratories, Inc. of Trevose, Pa.

Plastic surfaces which may be treated by the present invention include but are not limited to: thermoplastic olefins, polycarbonate/polyethyleneterephthalate, polycarbonate/acrylonitrile-butadiene-styrene, and polycarbonate/polybutylene terephthalate.

Prior rinse aid technology generally reduced the surface tension of the rinse water to aid water sheeting. However, in such a one stage treatment the rinse aid is removed from the plastic part surface with the water and is not present to affect subsequent rinse stages without further addition.

The process of the present invention comprises treating a plastic surface with a reactive rinse aid which reacts with the plastic surface and is not removed by rinsing. This allows the rinse aid to be applied in the earliest rinse stage and remain effective throughout subsequent rinse stages. This eliminates the necessity of applying the rinse aid in each rinse stage. There are numerous advantages in the use of reactive rinse aids. The rinse aid/drainage enhancing agent can be added in the rinse directly after the acid wash. There will be a reduction in carryover or drag-in of ionic salt as the plastic parts move through the process. Water sensitivity of the painted parts will be lessened as fewer and fewer ionic salts remain on the plastic parts. If the rinse aid is added early in the process, there is potential for reduced rinse water use in later stages. Contamination of later water stages will be reduced, thereby lessening the amount of makeup water needed.

The tannin treatment of the present invention is preferably applied to the plastic surface in an aqueous solution. Preferably the treatment is prepared in deionized water, however under certain conditions tap water is acceptable. The tannin may be added to the aqueous medium in concentrations greater than about 0.025% by weight. The preferred concentration is from about 0.05 to about 0.5% by weight. The present inventors anticipate that it is technically feasible that tannin compound concentrations of up to about 10% by weight will be effective in the present invention.

The pH of the aqueous solution of the tannin compound can be adjusted to improve effectiveness as a rinse aid enhancer. The process is most effective at pHs ranging from about 2 to 7. The preferred pH range is from about 3 to 6.

The process of applying the aqueous solution of tannin compound may be either by spraying the plastic part or by immersing the plastic part in the aqueous solution. However applied, sufficient contact time must be allowed for the tannin compound—plastic reaction to occur to provide for sufficient rinsability.

The present invention will now be further described with reference to a number of specific examples which are to be regarded solely as illustrative, and not as restricting the scope of the invention.

EXAMPLE I

Automotive grade thermoplastic olefin plastic parts were processed according to the following sequence.

| Stage | Treatment |
|---|---|
| 1 | 2% Permatreat 328, 140° F., 60 seconds |
| 2 | tap water rinse, 10 seconds |
| 3 | deionized water rinse, 60 seconds |
| 4 | deionized water rinse, 30 seconds |

Permatreat 328 is an acid cleaner available from Betz Laboratories, Inc., Trevose, Pa.

Dilute deionized water solutions (2% v/v) of HPC-8 (HPC-8 is an aqueous 6.3% v/v solution of tannic acid, pH adjusted with NaOH available from Betz Laboratories, Inc., Trevose, Pa.) were used in place of the deionized water rinse in Stage 3 of the above sequence. Evaluations were based on the weight of water retained on a 3 inch by 4 inch thermoplastic olefin plastic parts and visual observation of the surface wetting. The surface wetting was also observed when the part was rinsed with deionized water (Stage 4). The surface wetting was reported as percent water break free. A 100% water break free surface is wet with a continuous film of water. A 0% water break free surfaces has beads of water on its surface. Table I summarizes the results of the testing.

TABLE I

| Product/ Concentration | Weight of Water Retention (GMS) (Stage 3) | % Water Break Free (Stage 3) | % Water Break Free (Stage 4) |
|---|---|---|---|
| D.I. Water | 9.30 | 0 | 0 |
| 2% v/v HPC-8 pH = 4.0 | 7.30 | 100 | 100 |

The results reported in Table 1 show that the HPC-8 in aqueous solution reacts with the thermoplastic olefin plastic surface and provides an effective rinse aid which remains effective in subsequent rinse stages.

EXAMPLE II

The efficacy of tannin chestnut as a rinse aid was evaluated according to the following procedure with automotive grade thermoplastic olefin parts.

| Stage | Treatment |
|---|---|
| 1 | 2% Permatreat 328, 140° F., 60 seconds |
| 2 | Tap water rinse, 30 seconds |
| 3 | Spray with tannin chestnut, 30 seconds |
| 4 | Deionized (DI) water rinse |

The surface was evaluated after stage 3 and after stage 4. The tannin chestnut treatment solution was prepared by dissolving 6.3 grams of tannic chestnut in water. Sodium hydroxide was added to adjust pH and sufficient water added for a final mix weight of 100 grams. 3% dilutions, in water, of this concentrate were spray applied in stage 3. The treatment solution bath pH was lowered with dilute fluozirconic acid. Table II summarizes the results of the testing.

TABLE II

| | % Water Break Free | |
|---|---|---|
| pH | Stage 3 | Stage 4 |
| 6.1 | 25 | 0 |
| 4.9 | 98 | 25 |
| 4.4 | 98 | 95 |
| 4.0 | 100 | 85 |
| 3.5 | 100 | 100 |

Table II shows that tannin chestnut provides an effective rinse aid which remains effective in subsequent rinse stages.

EXAMPLE III

The efficacy of tannin quebracho as a rinse aid was evaluated according to the following procedure with automotive grade thermoplastic olefin parts.

| Stage | Treatment |
|---|---|
| 1 | 2% Permatreat 328, 140° F., 60 seconds |
| 2 | Tap water rinse, 30 seconds |
| 3 | Spray with tannin quebracho, 30 seconds |
| 4 | Deionized (DI) water rinse |

The surface was evaluated after stage 3 and after stage 4. The tannin quebracho treatment solution was prepared as a 1.9 gm/liter aqueous solution with pH adjusted with sodium hydroxide. Table III summarizes the results of the testing.

TABLE III

| | % Water Break Free | |
|---|---|---|
| pH | Stage 3 | Stage 4 |
| 5.2 | 100 | 80 |
| 4.5 | 95 | 90 |
| 3.9 | 85 | 85 |
| 3.5 | 85 | 65 |
| 3.0 | 100 | 98 |

Table III shows that tannin quebracho provides an effective rinse aid which remains effective in subsequent rinse stages.

EXAMPLE IV

The efficacy of tannin mimosa as a rinse aid was evaluated according to the following procedure with automotive grade thermoplastic olefin parts.

| Stage | Treatment |
|---|---|
| 1 | 2% Permatreat 328, 140° F., 60 seconds |
| 2 | Tap water rinse, 30 seconds |
| 3 | Spray with tannin mimosa, 30 seconds |
| 4 | Deionized (DI) water rinse |

The surface was evaluated after stage 3 and after stage 4. The tannin mimosa treatment solution was prepared as a 1.9 gm/liter aqueous solution with pH adjusted with sodium hydroxide and fluozirconic acid. Table IV summarizes the results of the testing.

TABLE IV

| | % Water Break Free | |
|---|---|---|
| pH | Stage 3 | Stage 4 |
| 6.8 | 100 | 100 |
| 6.3 | 100 | 100 |
| 5.6 | 100 | 100 |
| 5.0 | 100 | 100 |
| 4.5 | 100 | 95 |
| 3.9 | 98 | 95 |
| 3.5 | 90 | 90 |

EXAMPLE V

The efficacy of tannin mimosa as a rinse aid was evaluated at various treatment concentrations and pH's according to the following procedure with automotive grade polycarbonate/polyethyleneterephthalate parts. The treatments were prepared by dissolving 6.3% tannin mimosa in water with 0.06% of 50% sodium hydroxide. This concentrate was dissolved in water at 1% v/v and the bath pH adjusted with fluozirconic acid.

| Stage | Treatment |
|---|---|
| 1 | 2% Permatreat 328, 140° F., 60 seconds |
| 2 | Tap water rinse, 30 seconds |
| 3 | Spray with tannin mimosa, 30 seconds |
| 4 | Deionized (DI) water rinse |

The surfaces were evaluated after stage 3 and after stage 4 for parts at the time of treatment and for parts aged for up to 144 hours. Tables V summarizes the results.

TABLE V

| | % Water Break Free (1% tannin mimosa) | |
|---|---|---|
| pH | Stage 3 | Stage 4 |
| 3.0 | 100 | 100 |
| 4.0 | 100 | 100 |
| 5.0 | 100 | 100 |
| 6.0 | 100 | 100 |

EXAMPLE VI

The efficacy of tannin mimosa as a rinse aid was evaluated at various treatment concentrations and pH's according to the following procedure with automotive grade polycarbonate/acrylonitrile-butadiene-styrene parts. The treatments were prepared by dissolving 6.3% tannin mimosa in water with 0.06% of 50% sodium hydroxide. This concentrate was dissolved in water at 1 v/v and the bath pH adjusted with fluozirconic acid

| Stage | Treatment |
|---|---|
| 1 | 2% Permatreat 328, 140° F., 60 seconds |
| 2 | Tap water rinse, 30 seconds |
| 3 | Spray with tannin mimosa, 30 seconds |
| 4 | Deionized (DI) water rinse |

The surfaces were evaluated after stage 3 and after stage 4. Table VI summarizes the results.

TABLE VI

| | % Water Break Free (1% tannin mimosa) | |
|---|---|---|
| pH | Stage 3 | Stage 4 |
| 3.0 | 100 | 100 |
| 4.0 | 100 | 100 |
| 5.0 | 100 | 100 |
| 6.0 | 100 | 100 |

EXAMPLE VII

The efficacy of tannin mimosa as a rinse aid was evaluated at various treatment concentrations and pH's according to the following procedure with automotive grade polycarbonate/polybutyleneterephthalate. The treatments were prepared by dissolving 6.3% tannin mimosa in water with 0.06% of 50% sodium hydroxide. This concentrate was dissolved in water at 1% v/v and the bath pH adjusted with fluozirconic acid.

| Stage | Treatment |
|---|---|
| 1 | 2% Permatreat 328, 140° F., 60 seconds |
| 2 | Tap water rinse, 30 seconds |
| 3 | Spray with tannin mimosa, 30 seconds |
| 4 | Deionized (DI) water rinse |

The surfaces were evaluated after stage 3 and after stage 4. Tables VII summarizes the results.

TABLE VII

| | % Water Break Free (1% tannin mimosa) | |
|---|---|---|
| pH | Stage 3 | Stage 4 |
| 3.0 | 100 | 100 |
| 4.0 | 100 | 100 |
| 5.0 | 100 | 100 |
| 6.0 | 50 | 50 |

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A method of enhancing the drainage of residual aqueous rinse from a plastic surface comprising contacting said plastic surface with an effective amount of aqueous solution of plant derived tannin compound for the purpose of enhancing the drainage of residual aqueous rinse, wherein said compound remains on said plastic surface during subsequent rinse stages.

2. The method of claim 1 wherein the concentration of said tannin compound in said aqueous solution is greater than about 0.025% by weight.

3. The method of claim 1 wherein the concentration of said tannin compound in said aqueous solution is from about 0.05% to about 0.6% by weight.

4. The method of claim 1 wherein the pH of said aqueous solution is from about 2 to 7.

5. The method of claim 1 wherein the pH of said aqueous solution is from about 3 to 6.

6. The method of claim 1 wherein said tannin compound is prepared from tannins selected from the group consisting of tannic acid, tannin chestnut, tannin mimosa and tannin quebracho.

7. The method of claim 1 wherein said plastic surface is selected from the group consisting of thermoplastic olefin, polycarbonate/polyethylene terephthalate, polycarbonate/acrylonitrile-butadiene-styrene, and polycarbonate/polybutylene terephthalate.

8. A method of enhancing the drainage of residual aqueous rinse from the external surfaces of thermoplastic olefin plastic parts comprising contacting said thermoplastic olefin plastic parts with an effective amount of aqueous solution of tannic acid compound for the purpose of enhancing the drainage of residual aqueous rinse, wherein said compound remains on the surface of said part during subsequent rinse stages.

9. The method of claim 8 wherein the concentration of said tannic acid compound in said aqueous solution is greater than about 0.025% by weight.

10. The method of claim 8 wherein the concentration of said tannic acid compound in said aqueous solution is from about 0.05% to about 0.6% by weight.

11. The method of claim 8 wherein the pH of said aqueous solution is from about 2 to 7.

12. The method of claim 8 wherein the pH of said aqueous solution is from about 3 to 4.5.

* * * * *